US012791127B2

(12) United States Patent
Binder

(10) Patent No.: US 12,791,127 B2
(45) Date of Patent: Nov. 10, 2026

(54) SCREW CONNECTION SYSTEM, METHOD FOR SCREWING TOGETHER REINFORCED LONG MOLDED PARTS, AND USE OF A SCREW CONNECTION SYSTEM

(71) Applicant: PFLITSCH GMBH & CO. KG, Hueckeswagen Nordrhein Westfalen (DE)

(72) Inventor: Karlheinz Binder, Hueckeswagen Nordrhein-Westfalen (DE)

(73) Assignee: PFLITSCH GMBH & CO. KG, Hueckeswagen Nordrhein Westfalen (DE)

(*) Notice: Subject to any disclaimer, the term of this patent is extended or adjusted under 35 U.S.C. 154(b) by 1032 days.

(21) Appl. No.: 17/684,919

(22) Filed: Mar. 2, 2022

(65) Prior Publication Data

US 2022/0220991 A1 Jul. 14, 2022

Related U.S. Application Data

(63) Continuation of application No. PCT/EP2020/074412, filed on Sep. 2, 2020.

(30) Foreign Application Priority Data

Sep. 4, 2019 (DE) .................... 10 2019 123 671.1

(51) Int. Cl.

| | |
|---|---|
| ***F16L 19/065*** | (2006.01) |
| ***F16B 7/18*** | (2006.01) |
| ***F16L 19/06*** | (2006.01) |

(52) U.S. Cl.

CPC .......... *F16L 19/0656* (2013.01); *F16B 7/182* (2013.01); *F16L 19/06* (2013.01)

(58) Field of Classification Search

CPC ....... F16L 19/06; F16L 19/061; F16L 19/063; F16L 19/0656; F16L 19/08; F16L 19/14;

(Continued)

(56) References Cited

U.S. PATENT DOCUMENTS

| | | | | |
|---|---|---|---|---|
| 996,114 A | | 6/1911 | Muller | |
| 2,034,644 A | * | 3/1936 | Walsh ................ | F16L 33/2073 285/243 |

(Continued)

FOREIGN PATENT DOCUMENTS

| | | |
|---|---|---|
| DE | 94002177 | 5/1994 |
| DE | 69309633 | 9/1997 |

(Continued)

OTHER PUBLICATIONS

English Translation of an Office Action issued in corresponding CN Application 202080062359.5, issued Dec. 28, 2023, 9 pages.

(Continued)

*Primary Examiner* — David Bochna
(74) *Attorney, Agent, or Firm* — BURRIS LAW, PLLC

(57) ABSTRACT

A screw connection system can screw together at least one reinforced long molded part that includes at least one pressure element and a connecting part. The pressure element has a pressure contour. The connecting part has a clamping fixture. The clamping fixture includes a first inner clamping wall and a second outer clamping wall, between which a groove is formed. The pressure element can be applied to the connecting part, whereby the second outer clamping wall of the clamping fixture can be deformed by the pressure contour. The second clamping wall may be deformed radially inwards by the pressure contour. The second clamping wall may be deformable in the direction of the first clamping wall. The second clamping wall may be deformed such that it comes into contact with the first (Continued)

clamping wall when no reinforcement of a long molded part is arranged in the clamping fixture.

2 Claims, 2 Drawing Sheets

(58) Field of Classification Search
CPC ......... F16L 19/10; H01R 9/05; H01R 9/0524; H01R 9/18; H02G 3/0666
USPC .......................... 285/243, 247, 255, 322, 323
See application file for complete search history.

(56) References Cited

U.S. PATENT DOCUMENTS

| | | | | | |
|---|---|---|---|---|---|
| 2,877,027 | A * | 3/1959 | Bagnell | F16L 33/18 | 285/243 |
| 3,659,880 | A * | 5/1972 | Goldsobel | F16L 47/04 | 285/243 |
| 3,980,325 | A * | 9/1976 | Robertson | F16L 19/08 | 285/382.7 |
| 4,162,802 | A * | 7/1979 | Cox | F16L 19/10 | 285/382.7 |
| 4,585,255 | A * | 4/1986 | Ridenour | F16L 19/14 | 29/521 |
| 5,024,606 | A * | 6/1991 | Ming-Hwa | H01R 9/0518 | 439/578 |
| 5,072,072 | A * | 12/1991 | Bawa | H02G 3/0691 | 285/243 |
| 5,863,220 | A * | 1/1999 | Holliday | H01R 9/0521 | 439/462 |
| 7,240,925 | B2 * | 7/2007 | Fukano | F16L 47/041 | 285/322 |
| 8,157,294 | B2 * | 4/2012 | Sisk | F16L 47/041 | 285/243 |
| 2003/0037951 | A1 | 2/2003 | Hulsmann et al. | | |
| 2003/0139087 | A1 | 7/2003 | Sprunger | | |

FOREIGN PATENT DOCUMENTS

| | | |
|---|---|---|
| DE | 19738517 | 11/1998 |
| DE | 20119898 | 5/2002 |
| FR | 851712 | 1/1940 |
| GB | 2214728 | 9/1989 |
| WO | 2018157962 | 9/2018 |

OTHER PUBLICATIONS

Office Action issued in corresponding EP Application 20 764 567.2, issued Jan. 24, 2024, 6 pages.
Office Action issued in corresponding CN Application 202080062359.5, issued Jul. 17, 2024, and English translation thereof, 18 pages.
Office Action issued in corresponding EP Application 20 764 567.2, issued Jan. 24, 2024, and English translation thereof, 12 pages.
International Search Report for corresponding International Application PCT/EP2020/074412, mailed Oct. 29, 2020.

* cited by examiner

SCREW CONNECTION SYSTEM, METHOD FOR SCREWING TOGETHER REINFORCED LONG MOLDED PARTS, AND USE OF A SCREW CONNECTION SYSTEM

CROSS-REFERENCE TO RELATED APPLICATIONS

This application is a continuation of International Application No. PCT/EP2020/074412, filed on Sep. 2, 2020, which claims priority to and the benefit of DE 10 2019 123 671.1, filed on Sep. 4, 2019. The disclosures of the above applications are incorporated herein by reference.

FIELD

The present disclosure relates to a screw connection system, a method for screwing together reinforced long molded parts, and a use of a screw connection system.

BACKGROUND

The statements in this section merely provide background information related to the present disclosure and may not constitute prior art.

Screw connection systems for reinforced long molded parts (e.g., cables, lines, hoses, and tubes) are generally known from the prior art. WO 2018/157962 A1 describes one such screw connection system with a clamping element. The disclosure of WO 2018/157962 A1 is incorporated herein by reference in its entirety. In the assembled state, a clamping element typically serves to press a braided shielding arranged between a clamping surface and a contact surface against the contact surface.

A disadvantage of typical screw connection systems is that, during clamping, friction is applied to the reinforcement due to the rotational movement of the individual parts of the respective screw connection system that are screwed together. In some circumstances, this can inhibit precise clamping and may damage the reinforcement.

In some screw connection systems, such as those for reinforced cables, the reinforced long molded parts are screwed together with multi-part long molded part screw connections. In particular, these typically have a conical rigid clamping ring which is threaded onto the long molded part during assembly. When the long molded part fitting is screwed together, a reinforcement of the long molded part is clamped between a union nut and the clamping ring, in particular for decoupling. Particular care must be taken to ensure that the clamping ring is not lost before assembly. Furthermore, it must be ensured that the reinforcement is correctly arranged between the clamping ring loosely arranged on the long molded part and the union nut loosely arranged on the long molded part and a nipple loosely arranged on the long molded part on which the union nut is screwed. In particular, the clamping ring is often threaded on the wrong way round, so that the long molded part screw connection has to be disassembled again. When screwing, it is also no longer possible to check whether the reinforcement is correctly arranged and held in the screw connection.

The teachings of the present disclosure overcome these and other issues of typical screw connections systems.

SUMMARY

This section provides a general summary of the disclosure and is not a comprehensive disclosure of its full scope or all of its features.

The teachings of the present disclosure provide for precise clamping of a reinforcement of a long molded part.

In one form according to the teachings of the present disclosure, a screw connection system, in particular for screwing at least one reinforced long molded part, includes a pressure element and a connecting part. The pressure element has a pressure contour. The connecting part has a clamping fixture. The clamping fixture includes a first inner clamping wall and a second outer clamping wall, between which a groove is formed. The screw connection system is configured to apply the pressure element to the connecting part, and to deform the second outer clamping wall of the clamping fixture via the pressure contour.

In another form according to the teachings of the present disclosure, a method for screwing together at least one reinforced long molded part via a screw connection system includes the steps of: exposing a reinforcement of the long molded part; inserting the long molded part into the screw connection system; inserting the exposed reinforcement into a clamping fixture of a connecting part; and applying a pressure element of the screw connection system to the connecting part of the screw connection system, wherein a pressure contour of the pressure element deforms at least a second outer clamping wall of the clamping fixture in such a way that the reinforcement of the long molded part is held frictionally between a first inner clamping wall of the clamping fixture and the second outer clamping wall.

In yet another form, the teachings of the present disclosure provide for the use of a screw connection system for torsion-free clamping of a reinforcement of a long molded part.

According to one form, the teachings of the present disclosure provide for a screw connection system for screwing together at least one reinforced long molded part, the latter including at least one pressure element and a connecting part. The pressure element has a pressure contour. The connecting part has a clamping fixture. The clamping fixture includes a first inner clamping wall and a second outer clamping wall, between which a groove is formed. The pressure element can be applied to the connecting part, whereby the second outer clamping wall of the clamping fixture can be deformed by means of the pressure contour. In one form, the second clamping wall can be deformed radially inwards by means of the pressure contour. The second clamping wall may also be deformable in the direction of the first clamping wall. In one form, the second clamping wall can be deformed in such a way that it comes into contact with the first clamping wall when no reinforcement of a long molded part is arranged in the clamping fixture.

In comparison to typical systems, the system of the present disclosure has the advantage that there is no loosely arranged clamping ring and yet a reinforcement can be securely clamped or decoupled. Since there are fewer parts and the reinforcement can be plugged into a defined position in the clamping fixture, assembly is made easier compared to typical known systems. The clamping fixture of the present disclosure allows both wire meshes, for example for EMC decoupling, and reinforcements for mechanical protection to be screwed to the screw connection system. Reinforcement thicknesses determined by a rigid clamping ring substantially do not need to be considered.

The screw connection system of the present disclosure is configured for the screw connection of at least one reinforced long molded part. The at least one long molded part, as used herein, includes at least one elongated, in particular flexible, body selected from a group including cables, lines, hoses and/or tubes. In one specific form, the screw connection system may be used for screwing cables together. Long molded parts typically have a reinforcement, which is provided, for example, for the mechanical protection of the long molded parts. The reinforcement can be designed differently and have different materials, depending on the expected stress on the long molded part. For example, reinforcements may include at least one of wire mesh, fiber mesh, round wires, flat wires, strip iron, and/or foil. For example, the material of the reinforcement may include steel, copper, carbon fibers, and/or aramid fibers. In particular, for the purposes of this disclosure, the term "reinforcement" also includes shielding, in particular for electromagnetic shielding or ensuring electromagnetic compatibility, such as wire mesh, carbon fiber mesh and/or metallic or conductive foils.

Examples provided herein are not to be regarded as conclusive or exclusive. Rather, it is understood that a person skilled in the art can supplement them according to his or her expertise.

According to another form, the screw connection system includes a pressure element. The pressure element may optionally be designed as a union nut. In particular, the pressure element has a thread, such as an internal thread. In particular, the pressure element has an outlet opening, which may optionally be arranged at the head-side end of the pressure element. The exit opening may be configured for the passage of at least one long molded part. The exit opening may be a circular opening. In one form, the exit opening opens at the head-side end in a receiving recess. In one form, the receiving recess is continuous from a head-side end of the pressure element to a foot-side end of the pressure element, so that the long molded part can be guided completely through the pressure element. In one form, the receiving recess has a recess inner surface which can form at least the thread of the pressure element.

As used herein, "foot side" is a directional indication that reflects an orientation in the direction of the connecting means. In particular, in an assembled design, the term "foot side" is to be equated with in the direction of the connection geometry. The term "head side," as used herein, is an orientation opposite to "foot side," directed away from the connecting means. Furthermore, in at least one form, "head side," in an assembled configuration, means in the direction away from the connection geometry.

In one form, the pressure element has a pressure contour. The pressure contour may be formed by the recess inner surface. In one form, the pressure contour narrows an inner diameter of the receiving recess. In particular, an inner diameter becomes smaller in the direction of the head side. The pressure contour may have a radius. In a further form, the pressure contour includes a conical surface.

In one form, the pressure element has key contact surfaces, for example two, four, six or eight. A tool can be applied to the key contact surfaces to apply a torque, in particular to screw the pressure element to the connecting part.

It is understood that exemplary enumeration made herein is not to be regarded as conclusive or exclusive. Rather, it is understood that further explanations, which are within the scope of the knowledge of a person skilled in the art can be supplemented.

If, in the context of the present disclosure, the term "about" is used in connection with values or ranges of values, this is to be understood as a range of tolerance which the person skilled in the art considers to be usual in this field, in particular a range of tolerance of ±20%, or ±10%, or ±5% is provided. Insofar as different ranges of values are indicated in the present invention with respect to a same characteristic, the lower limits and the upper limits of the different ranges of values can be combined with each other.

In still another form, the screw connection system includes a connecting part. The connecting part is designed in particular for attachment to a connection geometry or to a further component of the screw connection system. The connection geometry is, for example, a housing or a wall. In one form, the connecting part is designed as a nipple, which can be attached to the connection geometry, for example. The connecting part may optionally be a double nipple. In one form, the connecting part has at least one connecting means. The at least one connecting means may optionally be designed as a thread. In one form, the connecting means is designed as an internal thread or as an external thread. The connecting means can be used to make a connection with the connection geometry. In a further form, a connection to a nipple and/or a further component, in particular of the screw connection system, can be made via the connecting means. In a further form, a further component of the screw connection system is a screw connection body, for example for strain relief and/or sealing of an elongated part. a pressure contour, for example, in order to interact with a sealing insert of the screw fitting body.

According to one form of the teachings of the present disclosure, the connection geometry is a component through which the at least one elongated part can be guided. The connection geometry is not part of the screw connection system. For example, the connection geometry is a wall, a housing or a cable guide. Advantageously, the screw connection system can be attached to the connection geometry not attributable to the screw connection system. The connection geometry may have a through recess through which the at least one long molded part can be guided. The screw connection system may be attached to the connection geometry in such a way that the longitudinal axis of the connecting part is substantially perpendicular to a surface of the connection geometry and/or passes through the through recess. In one form, the through recess has a thread into which the connecting part can advantageously be screwed with its connecting means including an external thread. In a further form, the through recess does not have a thread and is designed as a bore.

In one form, the connecting part has a pressure element receptacle. The pressure element receptacle may be configured as a thread. In one form, the pressure element receptacle is configured as an external thread. In one form, the pressure element receptacle is configured as an internal thread. In one form, the connecting part has key contact surfaces associated with the pressure element receptacle, for example two, four, six or eight key contact surfaces. In one form, a number of threads are at least partially interrupted by the key contact surfaces.

In one form, the connecting part has a stop. The stop includes an upper stop face. The upper stop face is a surface, such as an offset surface, against which the pressure element can be screwed. The upper stop face may be associated with the thread of the connecting part. For example, the upper stop face may be a surface whose surface normal direction is substantially parallel to a longitudinal axis of the connecting part.

The term "substantially," as used herein indicates a range of tolerance which is justifiable for the person skilled in the art from an economic and/or technical point of view, so that the corresponding feature can still be recognized or realized as such.

In one form, the connecting part has a seal. In one form, it is provided that a seal is arranged on a sealing section of the connecting part. The sealing section may be arranged between the stop and the pressure element receptacle when the pressure element is arranged on the connecting part and may be when the pressure element is screwed onto the connecting part up to the stop or up to the upper stop face. In one form, the seal is a sealing sleeve, an O-ring, or a sealing material molded onto the connecting part. In another form, the seal is associated with the stop.

In yet another form, the connecting part includes a clamping fixture. The clamping fixture may be arranged substantially above the pressure element receptacle. The clamping fixture includes a first, inner clamping wall. The clamping fixture includes a second, outer clamping wall. The second, outer clamping wall may be thinner walled than the first, inner clamping wall. In a further form, the first, inner clamping wall has substantially the same wall thickness as the second, outer clamping wall.

At least the second, outer clamping wall may be deformed by screwing on the pressure element. As a result of the deformation, the second, outer clamping wall approaches the first, inner clamping wall to such an extent that they lie against each other. If a reinforcement of a long molded part is arranged in the groove between the first, inner clamping wall and the second, outer clamping wall, it is clamped or frictionally held between the two clamping walls. In one form, the second, outer clamping wall is only deformed until it rests against the reinforcement.

In a further form, the present disclosure provides that the first inner clamping wall is at least indirectly deformable. If, for example, the pressure element is screwed onto the connecting part up to the stop, it is provided in one form that, if the reinforcement is arranged in the groove, the pressure element deforms the second, outer clamping wall and, if applicable, the reinforcement inwards in such a way that the first, inner clamping wall is also deformed. The first, inner clamping wall may be arranged in the receiving recess in such a way that it does not exert any pressure on the long molded part even in the case of maximum deformation by the pressure contour, i.e., when the pressure contour is fully screwed on against a stop. For this purpose, a distance is provided between the expected long molded part and the first, inner clamping wall, which may be greater than or equal to the maximum radial deformation. In one form, at least the first, inner clamping wall is conical. The first, inner clamping wall and/or the second, outer clamping wall may be conically shaped and arranged concentrically to each other. The clamping walls may be arranged substantially parallel in a longitudinal section through the connecting part. Advantageously, the conical and concentric arrangement of the clamping walls improves deformation and clamping of the reinforcement.

According to one form, the first, inner clamping wall and/or the second, outer clamping wall has at least one weakening zone and/or a stiffening zone. The second outer clamping wall may have at least one weakening zone and/or one stiffening zone. In this way, a deformation, folding or crimping of the clamping wall can be advantageously adjusted when the pressure element is screwed on. For example, the clamping wall can be folded in the area of a weakening zone so that improved contact of the clamping wall with the reinforcement is achieved and, in one form, static friction between the reinforcement and the clamping walls may be increased. If, for example, a stiffening zone is provided on at least one clamping wall, the deformation, folding or crimping of the clamping wall can be advantageously influenced. Weakening zones or stiffening zones can be implemented, for example, by material tapers, recesses, beads, material thickenings, folds and/or corrugations.

In one form, the teachings of the present disclosure provide that the first, inner clamping wall projects beyond the second, outer clamping wall at least in a longitudinal direction of the connecting part. In a further form, it is provided that the first, inner clamping wall projects at least partially radially beyond the second, outer clamping wall. In a further form, the second, outer clamping wall projects at least partially radially beyond the first, inner clamping wall. In particular, if the clamping walls are conical and extend radially, they can be arranged at least partially one above the other.

In one form, the second clamping wall includes at least one viewing recess that may extend completely radially through the clamping wall. A plurality of viewing recesses may optionally be provided. A plurality of viewing recesses may be arranged distributed around a circumference of the second clamping wall. In one form, the clamping wall has at least one viewing recess, and in one form may have at least two to eight viewing recesses. The at least one viewing recess may be arranged in the lower third of the clamping wall. The visual recess may allow a visual check of the depth of engagement of the reinforcement of the long molded part in the groove of the clamping fixture. In this way, it can be advantageously ensured that the reinforcement engages far enough into the groove and that the clamping takes place when the pressure element is screwed onto the connecting part. The viewing recess may be arranged near a groove bottom of the groove so that the correct arrangement of the reinforcement in the groove can be checked and a defined frictional connection of clamping walls and reinforcement can be achieved.

According to one form, the at least one viewing recess is designed as a borehole. In one form, the recesses are elongated holes. In one form, the second, outer clamping wall is slotted. In one form, the clamping wall has at least one slot, and may have at least two to eight slots. In one form, the clamping wall has a plurality of slots. In one form, the second, outer clamping wall is slotted from an upper or head-side edge of the clamping wall. The slots may have the same or different configurations. The at least one slot may extend from the top edge to substantially the pressure element receptacle or substantially the bottom of the slot and may be about ⅔ of a height of the second, outer clamping wall, or, in another example, may be about ½ of the height of the second, outer clamping wall, or, in yet another example, may be about ¼ of the height of the second, outer clamping wall.

In one form, the second clamping wall has a plurality of partial walls. The partial walls may be spaced apart from each other.

In one form, the second, outer clamping wall extends circumferentially around the first clamping wall. In one form, the first clamping wall and the second clamping wall are arranged concentrically to each other. The first inner clamping wall and/or the second outer clamping wall are cylindrically and/or conically shaped. An inner surface and/or an outer surface has a conical and/or cylindrical shape. A groove is formed between the first clamping wall and the second clamping wall. The groove may be designed to receive the reinforcement of the long molded part. The clamping walls have a spacing of about 0.1 mm to about 4 mm, or, in one example, about 0.5 mm to about 3 mm, or, in another example, about 0.5 to about 2 mm. At the deepest point, the groove has the groove base, which is arranged between the first and second clamping walls. The groove base can be flat or rounded. In one form, the groove base has a radius. In one form, it is provided that a distance between the clamping walls decreases or increases towards the groove bottom. In one form, it is provided that the groove has a conical shape in a longitudinal section.

In one form, reinforcements with a diameter of about 0.2 mm to about 2.5 mm can be clamped by means of the screw connection system, or, in example, the reinforcements can have a diameter of about 0.5 mm to about 1.6 mm. In another form, the clamping fixture has a clamping range of about 0 mm to about 3 mm, or, in another example, about 0 mm to about 2 mm.

In a further form, it is provided that the clamping fixture is integrally connected to the connecting part. In a further form, the clamping fixture is connected to the connecting part in one piece. In a further form, it is provided that the first, inner clamping wall and/or the second, outer clamping wall is connected in one piece to the connecting part. In a further form, it is provided that the first, inner clamping wall and/or the second, outer clamping wall is connected in one piece, and may be integrally, to the connecting part. The inner clamping wall and the outer clamping wall may be connected in one piece or integrally with the connecting part. In one form, a groove is formed by means of the inner clamping wall and the outer clamping wall, into which the reinforcement of the long part may be inserted. In one form, the inner clamping wall and the outer clamping wall are connected, in particular materially connected, via a groove base. In one form, the groove base is made of the material of the connecting part. The groove may be an annular groove. In one form, it is provided that the substantially ring-shaped clamping walls, which may be arranged concentrically to one another, form the groove in their intermediate space. In one form, the groove is milled into the material of the connecting part. The clamping walls are formed by milling the groove. In another form, the groove or the clamping walls, e.g., the connecting part, is cast or generatively produced.

As used herein, "one-piece" means that, for example, at least one of the clamping walls, e.g., at least the second, outer clamping wall, and the connecting part form a unit. The respective clamping wall is held pre-assembled on the connecting part. The clamping wall or the clamping fixture is not arranged on the connecting part in a non-destructively detachable manner. The clamping wall or the clamping fixture can, for example, be crimped onto the connecting part. In a further form, the clamping wall or clamping fixture is welded or bonded to the connecting part. The advantage of this configuration is that the clamping wall, which can be cold-formed, can be made of a different material from the connecting part.

As used herein, "integral" means that two parts are made from one piece, for example cast, forged or machined from a blank, e.g., milled or turned, and are therefore of the same material.

An advantage of the one-piece and/or integral design of the clamping fixture and connecting part is that there are no parts that can be lost or incorrectly assembled. The screw connection system is thus easier to assemble than typical known screw connections. Additionally, the assembly of the screw connection system is simplified.

In one form, the screw connection system has an electrically conductive material. The screw connection system may be made of a cold-formable material. In one form, the connecting part, in particular the connecting means, has an electrically conductive material. In one form, the connecting means has at least one material selected from a group including steel, spring steel, copper, brass, carbon fiber and/or plastic. In a further form, it is provided that at least the second, outer clamping wall includes a cold-formable material. In a further form, it is provided that at least the first, inner clamping wall includes a cold-formable material.

In one form, the pressure element can be applied to the connecting part. At least the second, outer clamping wall is deformable via the pressure contour. In one form, the deformation of the at least second, outer clamping wall by the pressure contour is a substantially elastic deformation. An advantage of the substantially elastic deformation is that the screw connection system can be easily disassembled from the long molded part and, if necessary, allows corrections to be made during assembly or at a later time. In one form, the deformation of the at least second, outer clamping wall by the pressure contour is a substantially plastic deformation. An advantage of the substantially plastic deformation is that even when the pressure screw is loosened, the reinforcement is still held in the clamping fixture.

In a first exemplary form of the screw connection system, it has the pressure element and the connecting part. The pressure element is screwed onto the pressure element receptacle of the connecting part on the head side. On the foot side, the connecting part has a connecting means with which the connecting part can be screwed to a connection geometry. The pressure element has exemplary key contact surfaces, which are designed for contact, in particular of a wrench, in order to screw the pressure element onto the connecting part with a defined torque. The pressure element has an exit opening that opens into a receiving recess. A long molded part can be guided through the receiving recess. The receiving recess has an inner recess surface which extends completely through the pressure element in the longitudinal direction and adjoins a head-side surface of the pressure element and a foot-side surface of the pressure element. The recess inner surface has a pressure contour and an internal thread, the pressure contour being formed on the head side and the internal thread being formed on the foot side by the recess inner surface. The internal thread can be screwed onto the pressure element receptacle of the connecting part. The connecting part has the connecting means, which is arranged below a stop. The connecting means is designed as an external thread as an example. The stop includes a lower stop surface. The lower stop surface is a surface, and may be an offset surface, which can be screwed against the connection geometry. The lower stop surface may be associated with the connecting means of the connecting part. For example, the lower stop face is a surface whose surface normal direction is substantially parallel to a longitudinal axis of the connecting part. The stop or the lower stop face can be provided for limiting the screw-in depth of the connecting part into the connection geometry. In another example, the stop can be designed to limit the screwing on of the pressure element. For example, the screw-on depth of the pressure element can also be limited by the design of a clamping fixture.

In one form, the clamping fixture has a first, inner clamping wall and a second, outer clamping wall. A groove is formed between the first, inner clamping wall and the second, outer clamping wall, into which a reinforcement of the long molded part, which can be designed as a reinforced cable, can be inserted. The reinforcement is inserted up to the bottom of the groove, or just before the bottom of the groove, to obtain improved clamping. The first, inner clamping wall protrudes over the second, outer clamping wall on the head side. This facilitates the insertion of the reinforcement. Furthermore, the first, inner clamping wall has a conical surface which also facilitates the insertion of the reinforcement. The second, outer clamping wall is cylindrical by way of example.

In a second exemplary form, it is provided that the screw connection system includes the pressure element and the connecting part, wherein the connecting part can be screwed onto a double nipple. The connecting thread is an internal thread by way of example. A first sealing insert is arranged between the connecting part and the double nipple by way of example. A union nut can be screwed onto the pressure element, whereby a second sealing insert can be arranged between the union nut and the pressure element. The receiving recess of the pressure element is aligned with the recesses for the long molded part of the connecting part and the union nut, the nipple and the sealing inserts, in the direction of a longitudinal axis of the screw connection system.

In the first and second exemplary forms, the second, outer clamping wall can be deformed radially inward by the pressure contour of the pressure element. When no reinforcement is arranged in the groove and the pressure element is maximally screwed onto the pressure element receptacle, the second, outer clamping wall nestles against the first, inner clamping wall. In the exemplary forms, the first inner clamping wall is substantially not deformable by the pressure element. Advantageously, this is achieved by a corresponding wall thickness of the first, inner clamping wall. The pressure element cannot be screwed on further after the second, outer clamping wall has come into contact with the first, inner clamping wall and, in particular, cannot be screwed onto the connecting part up to the stop. If a reinforcement is arranged in the groove, the pressure element cannot be screwed further onto the connecting part after the first, inner clamping wall has been applied and pressed against the reinforcement and the latter against the second, outer clamping wall, i.e., after the clamping fixture has been closed. Advantageously, in this exemplary form, the pressure element is tightened with a defined moment after the clamping fixture is closed.

In a third exemplary form, it is provided that the first, inner clamping wall is designed to be deformable. In particular, it is provided that the first, inner clamping wall and the second, outer clamping wall have substantially the same wall thickness. The deformability of the first, inner clamping wall permits the pressure element to be further screwed onto the connecting part even when the clamping fixture is closed with or without the reinforcement arranged in it, i.e., the walls and/or the reinforcement are in contact with each other and pressed together. In this way, the pressure element can be screwed up to the stop. This allows the correct assembly of the screw connection system to be checked and locks the internal thread of the pressure element with the pressure element receptacle of the connecting part. This ensures a secure fit of the screw connection system. In one variant, it is also provided that the first, inner clamping wall and/or the second, outer clamping wall have stiffenings or weakenings in order to achieve a specific folding or deformation of the respective clamping wall when the pressure element is screwed on.

In the third exemplary form, it can also be provided that the first, inner clamping wall or the second, outer clamping wall, or both clamping walls, are conically shaped. In particular, these are tapered in the circumference on the head side.

For example, a screw connection system is provided for screwing at least one reinforced long molded part, which includes at least one pressure element and a connecting part, wherein the pressure element has a pressure contour, wherein the connecting part has a clamping fixture, wherein the clamping fixture includes a first inner clamping wall and a second outer clamping wall, between which a groove is formed, wherein in particular the pressure element can be applied to the connecting part and by means of the pressure contour the second outer clamping wall of the clamping fixture can be deformed, wherein the first inner clamping wall and/or the second outer clamping wall may be cylindrically and/or conically shaped, wherein the first inner clamping wall may have substantially the same wall thickness as the second outer clamping wall.

In all exemplary forms, the second, outer clamping wall may have viewing recesses which extend completely radially through the clamping wall. When mounting the reinforcement in the clamping fixture, the viewing recesses can be used to check whether the reinforcement is arranged sufficiently deep in the groove.

A method for screwing together at least one reinforced long molded part via a screw connection system, according to the teachings of the present disclosure, includes the steps of: exposing a reinforcement of the long molded part; inserting the long molded part into the screw connection system; inserting the exposed reinforcement into a clamping fixture of a connecting part; and applying a pressure element of the screw connection system to the connecting part of the screw connection system, wherein a pressure contour of the pressure element deforms at least a second outer clamping wall of the clamping fixture in such a way that the reinforcement of the long molded part is held frictionally between a first inner clamping wall of the clamping fixture and the second outer clamping wall.

An advantage of the method is that the assembly of reinforced long molded parts can be carried out much faster than with known systems. The clamping fixture is attached to the screw connection system in such a way that it cannot be lost and does not have to be assembled in a single step. Furthermore, incorrect assembly of the screw connection system is ruled out, so that a secure hold of the long molded part or the reinforcement in the screw connection system is ensured.

In one form, a penetration depth of the exposed reinforcement into the clamping fixture is checked via at least one viewing recess.

The pressure element may be positioned in the area of the exposed reinforcement on the long molded part. The pressure element presses the exposed reinforcement at least slightly radially inwards. In a next step, the connecting part may be screwed into the pressure element, such as up to a stop, and may be in such a way that at least a second, outer clamping wall of the clamping fixture is deformed radially inwards and clamps the exposed reinforcement. During the screwing process, the connecting part and/or the pressure element is optionally rotated. As soon as clamping of the reinforcement in the clamping fixture begins, only the pressure element is rotated and the connecting part is fixed. A control disassembly may then be carried out, during which the pressure element may be unscrewed from the connecting part. The connecting part may be fixed and the pressure element may be rotated. The clamping fixture ensures that the exposed reinforcement remains in it. At least one visual recess can be used to check whether the reinforcement is inserted sufficiently deep in the groove between the clamping walls after the pressure element has been removed from the connecting element. After checking the end ring depth of the reinforcement in the clamping fixture, the pressure element is arranged again on the connecting part.

This process step advantageously ensures that the reinforcement is inserted sufficiently deep in the clamping fixture. This ensures that the static friction for holding the reinforcement in the clamping fixture is sufficiently high.

In one form, the pressure element on the connecting part is tightened with a defined moment to ensure a frictional hold between the clamping fixture and the reinforcement of the long molded part.

If the pressure element is not screwed to a stop, it is possible to ensure that the clamping fixture has been deformed sufficiently to hold the reinforcement in it by monitoring or checking the torque.

In one form, the pressure element is screwed against a stop of the connecting part and/or onto the connecting part.

This form has the advantage that, by screwing the pressure element against a stop, the threads of the pressure element and the connecting part are clamped or locked against each other and thus loosening or shaking free of the pressure element can be substantially prevented. In particular, the pressure element is screwed against the stop. Furthermore, in one form, it can be provided that the clamping fixture is designed in such a way that the clamping is correct, i.e., the clamping walls are sufficiently deformed, at the latest when the pressure element is screwed against the stop. In a further form, the first, inner clamping wall and/or the second, outer clamping wall are plastically and/or elastically deformed.

In a first exemplary method for assembling a long molded part, such as a reinforced cable with a screw connection system, a reinforcement of the long molded part is exposed and cut. The long molded part is guided through the pressure element and the connecting part. The reinforcement is inserted into the groove of the clamping fixture of the connecting part and the pressure element is screwed onto the connecting part. When the pressure element is screwed to the connecting part, the pressure element deforms at least the second, outer clamping wall radially inwards so that it comes into contact with the reinforcement. During further screwing on, the reinforcement is pressed between the first, inner clamping wall and the second, outer clamping wall and held in a force-fit.

In a second exemplary method, when the first, inner clamping wall is substantially not deformable by the pressure element, a defined moment is applied after the method steps described in the first example to ensure a frictional connection between the reinforcement and the clamping walls.

In a third exemplary method, when the first, inner clamping wall is substantially deformable by the pressure element, the pressure element is screwed against a stop of the connecting part after the method steps described in the first example, e.g., with a defined torque.

Furthermore, a use of a screw connection system described above for torsion-free clamping of a reinforcement of a long molded part is disclosed. The screw connection system may be used for torsion-free clamping and/or decoupling of a reinforcement of a cable.

For example, the screw connection system can be used to ensure or improve electromagnetic compatibility. For example, the screw connection system can be used to secure the reinforcement of a long molded part and provide mechanical protection. In a further form, the screw connection system may be used for strain relief of long molded parts. In a further form, the screw connection system may be used for lightning discharge or fault current discharge. In a further form, the screw connection system may be used for safe current conduction.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
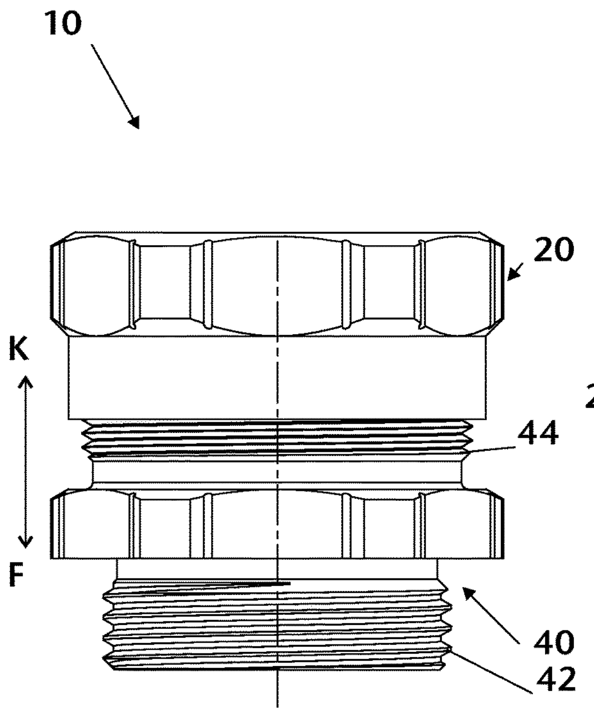
FIG. 1 is a side view of a screw connection system of a first configuration in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a first configuration of a screw connection system 10 according to the teachings of the present disclosure. A pressure element 20 and a connecting part 40 can be seen in the side view. The pressure element 20 is screwed onto a pressure element receptacle 44 of the connecting part 40 on the head side K. On the foot side F, the connecting part 40 has a connecting means 42, with which the connecting part 40 can be screwed to a connection geometry that is not shown.

Figure 2:
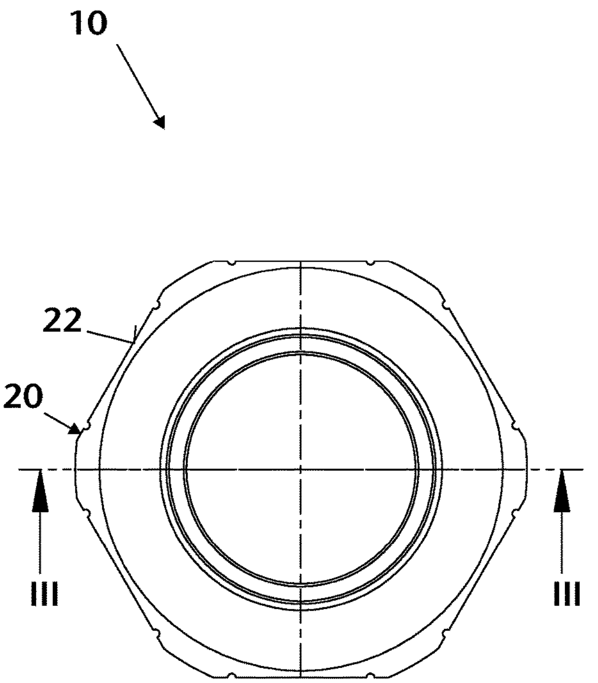
FIG. 2 is a top view of the screw connection system of FIG. 1.

FIG. 2 shows a top view of the configuration of FIG. 1. The pressure element 20 has key contact surfaces 22, which are designed for contact, such as by a wrench, in order to screw the pressure element 20 onto the connecting part 40.

Figure 3:
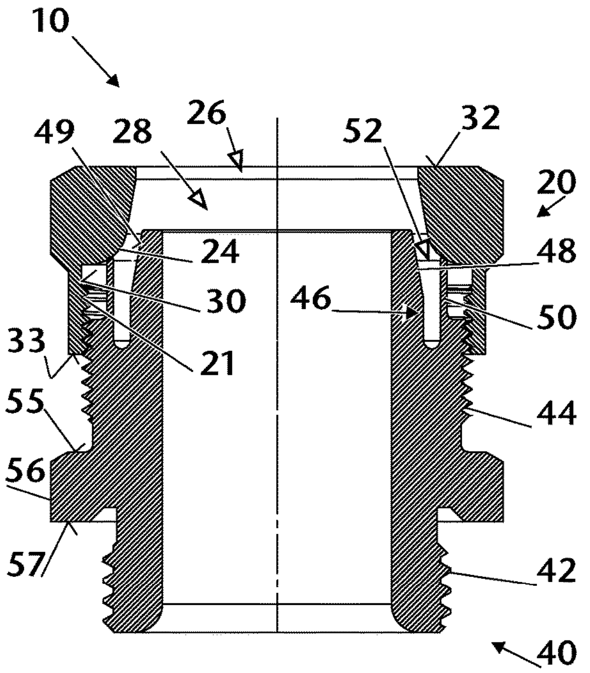
FIG. 3 is a cross-sectional view of the screw connection system of FIG. 1, taken along line III-III shown in FIG. 2, illustrating a clamping fixture in an undeformed state.
Figure 6:
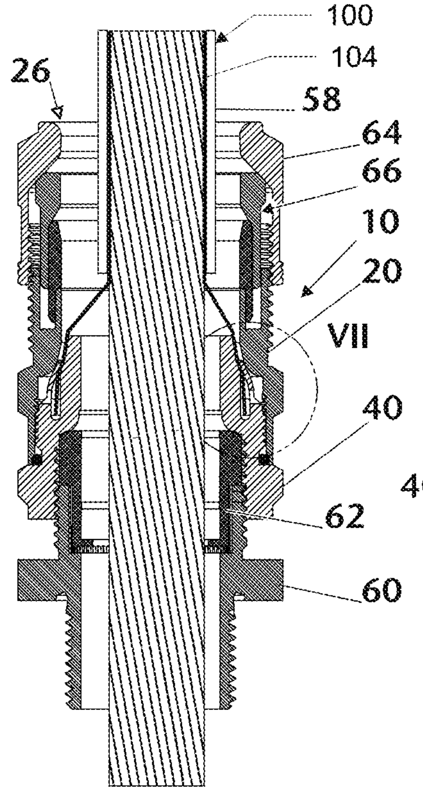
FIG. 6 is a cross-sectional view of the screw connection system of FIG. 5.

FIG. 3 shows a sectional view, taken along line III-III from FIG. 2, with an undeformed clamping fixture 46. The pressure element 20 has an exit opening 26 which opens into the receiving recess 28. A long molded part, which is not shown, can be guided through the receiving recess 28. The receiving recess 28 has a recess inner surface 30 adjacent a head side surface 32 of the pressure element 20 and a foot side surface 33 of the pressure element 20. The recess inner surface 30 has a pressure contour 24 and an internal thread 21. The internal thread 21 is threaded onto the pressure element receptacle 44 of the connecting part 40. The connecting part 40 has a stop 56. The stop 56 has an upper stop face 55 and a lower stop face 57. The connecting part 40 has the connecting means 42, which is arranged below a stop 56. The connecting means 42 can be an external thread. The stop 56 is provided for limiting the screw-in depth of the connecting part 40 in a connection geometry, not shown. In another example, not specifically shown, the stop 56 can also be configured to limit the screwing on of the pressure element 20. In the configuration shown in FIG. 3, a screw-on depth of the pressure element 20 is limited by a clamping fixture 46, as can also be seen in FIG. 4. The clamping fixture 46 has a first, inner clamping wall 48 and a second, outer clamping wall 50. The inner clamping wall 48 and the outer clamping wall 50 are integrally connected to the remainder of the connecting part 40. A groove 52 is formed between the first, inner clamping wall 48 and the second, outer clamping wall 50, into which a reinforcement 104 of the long molded part 100 and can in particular be designed as a reinforced cable, can be inserted (FIG. 6). The groove 52 is an annular groove, with substantially annular and concentric clamping walls 48 and 50 forming the groove 52 in the space between them. At its deepest point, the groove 52 has a groove bottom, not further specified, arranged between the first and second clamping walls. The inner clamping wall 48 and the outer clamping wall 50 are materially connected via the groove base. The groove base is formed from the material of the connecting part 40. The reinforcement 104 is inserted up to the groove base in order to obtain improved clamping. The first, inner clamping wall 48 protrudes at the head end over the second, outer clamping wall 50. This facilitates insertion of the reinforcement 104. Furthermore, the first, inner clamping wall 48 has a conical surface 49 or chamfer, which also facilitates the insertion of the reinforcement 104. As explained above, the clamping walls 48, 50 can be of different shapes, for example cylindrically or conically shaped or having weakening areas and/or stiffening areas.

Figure 4:
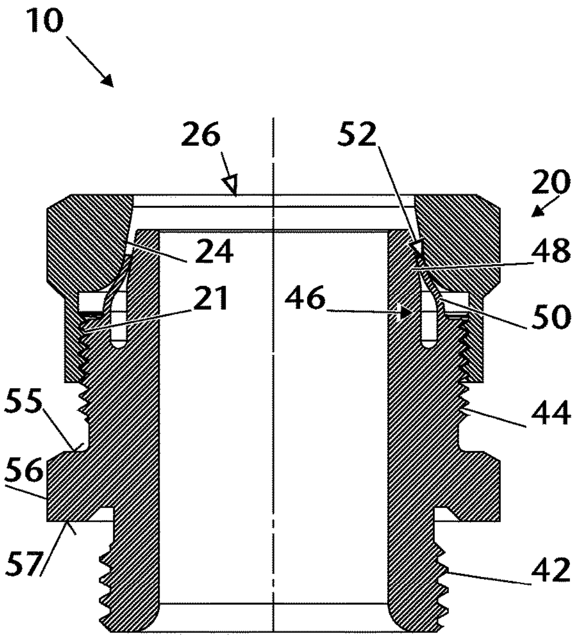
FIG. 4 is a cross-sectional view similar to FIG. 3, illustrating the clamping fixture in a deformed state.

FIG. 4 shows a cross-sectional view similar to FIG. 3, except with the clamping fixture 46 illustrated in a deformed state. In particular, the second, outer clamping wall 50 is deformed radially inward by the pressure contour 24 of the pressure element 20. Since no reinforcement 104 is arranged in the groove 52 shown in FIG. 4 and the pressure element is screwed onto the pressure element receptacle 44 to a maximum, the second, outer clamping wall 50 nestles against the first, inner clamping wall 48, though it is understood that reinforcement 104, not shown, would be positioned therebetween when screwed thereon for operation. As shown in FIG. 4, the pressure element 20 is limited in screw-on depth by the clamping walls 48, 50. In particular, the first, inner clamping wall 48 is substantially not deformable by the pressure element 20. Consequently, the pressure element 20 cannot be screwed onto the connecting part 40 up to the stop 56 or up to the upper stop face 55. In a configuration not shown, which is explained in detail above, the pressure element 20 can be screwed onto the pressure element receptacle 44 to such an extent that the foot-side surface 33 of the pressure element 20, which is designated in FIG. 3, rests on the upper stop face 55.

Figure 5:
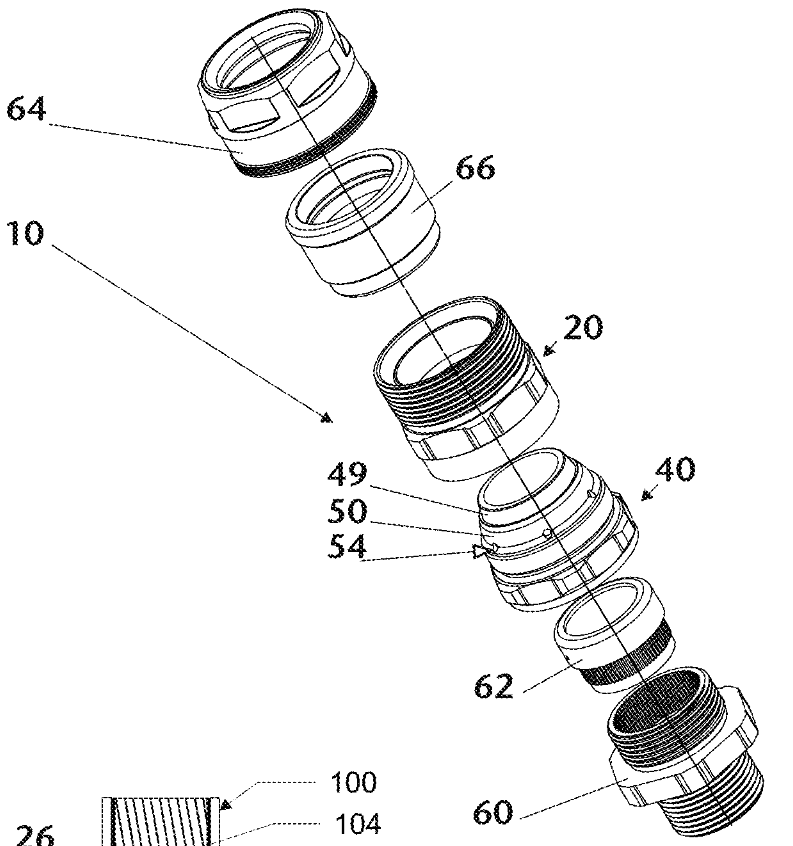
FIG. 5 is an exploded view of a screw connection system of a second configuration in accordance with the teachings of the present disclosure.

FIG. 5 shows an exploded view of a second configuration of a screw connection system 10. The screw connection systems 10 of FIGS. 1-4 and 5-7 can be similar except as otherwise shown or described herein. Thus, similar features are indicated with similar reference numerals and only differences are described in detail herein. The screw connection system 10 has the pressure element 20 and the connecting part 40, which can be screwed onto a double nipple 60. A first sealing insert 62 is arranged between the connecting part 40 and the double nipple 60. A union nut 64 can be screwed onto the pressure element 20, with a second sealing insert 66 being arranged between the union nut 64 and the pressure element 20.

FIG. 6 shows a sectional view through the screw connection system according to FIG. 5 in the assembled state. The receiving recess 28 of the pressure element 20 is aligned with the recesses of the connecting part 40, which are not further designated, as well as the union nut 64, the nipple 60 and the sealing inserts 62, 66 in the direction of a longitudinal axis 58 of the screw connection system 10.

Figure 7:
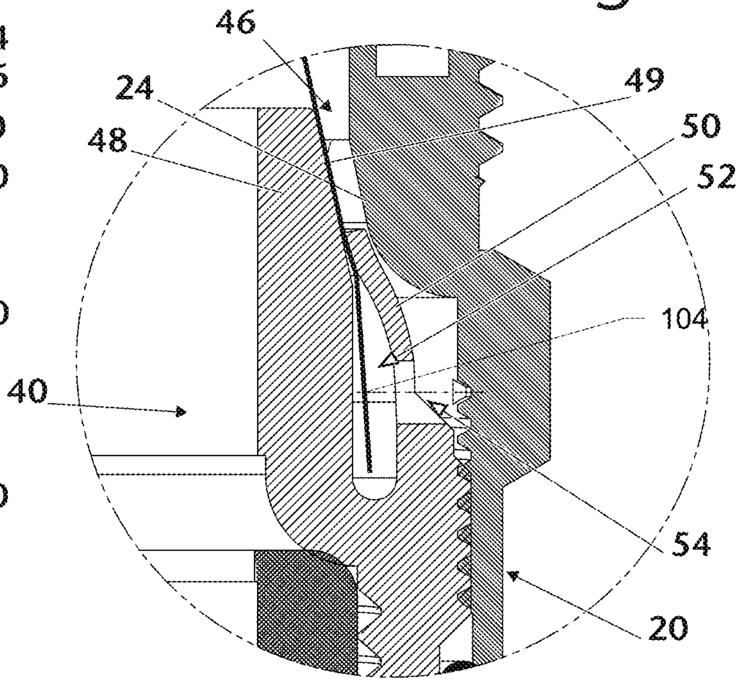
FIG. 7 is a cross-sectional view of the portion of the screw connection system of FIG. 5 indicated by circle VII shown in FIG. 6.

FIG. 7 shows a portion of the screw connection system 10 indicated by circle VII shown in FIG. 6. As shown in FIG. 7, the pressure element 20 is screwed onto the connecting part 40 to such an extent that the second, outer clamping wall 50 is formed radially in the direction of the first, inner clamping wall 48. A reinforcement 104 of a long molded part 100 is clamped in the groove 52 between the clamping walls 48, 50. During assembly of the reinforcement 104 in the clamping fixture 46, in particular during a control disassembly of the screw connection system 10, it can be checked via the viewing recesses 54 whether the reinforcement 104 is arranged sufficiently deep in the groove 52. As explained above, viewing recesses may also be provided in other configurations of the screw connection system 10, such as that shown in FIGS. 1-4.

With the disclosed screw connection system, reinforced long molded parts can be screwed together with little assembly effort. In addition, fewer individual parts are required than in the state of the art, which avoids loss or incorrect assembly.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of screwing together a cable with a reinforcement via a screw connection system, the screw connection system including a pressure element having a pressure contour and a connecting part including a clamping fixture, the clamping fixture includes a first inner clamping wall and a second outer clamping wall between which a groove is formed into which the reinforcement of a reinforced cable is insertable, and clamped by the screw connection system, the first, inner clamping wall and the second, outer clamping wall is connected in one piece to the connecting part, the second, outer clamping wall is thinner walled than the first, inner clamping wall, the pressure element is configured to be applied to the connecting part, and wherein the second outer clamping wall of the clamping fixture is configured to be deformed by the pressure contour, the second outer clamping wall extends circumferentially around the first inner clamping wall, the pressure contour of the pressure element is arranged in such a way that the pressure contour deforms at least the second outer clamping wall of the clamping fixture in such a way that the reinforcement of the reinforced cable is held between the first inner clamping wall of the clamping fixture and the second outer clamping wall, and the first, inner clamping wall is arranged in a receiving recess in such a way that it does not exert any pressure on the reinforced cable inserted in the screw connection system even in the case of maximum deformation by the pressure contour, the method comprising:

exposing the reinforcement of the cable;

inserting the cable into the screw connection system;

inserting the exposed reinforcement into the clamping fixture of the connecting part;

applying the pressure element of the screw connection system to the connecting part of the screw connection system, and tightening the pressure element on the connecting part with a predefined torque to ensure a frictional hold between the clamping fixture and the reinforcement of the cable, wherein the pressure contour of the pressure element deforms at least the second outer clamping wall that continuously extends circumferentially around the first inner clamping wall of the clamping fixture so that the reinforcement of the cable is frictionally held between the first inner clamping wall of the clamping fixture and the second outer clamping wall.

2. The method according to claim 1 further comprising screwing the pressure element onto the connecting part until the pressure element is against a stop of the connecting part.

* * * * *